(No Model.)

J. W. HENNEY.
VEHICLE SPRING.

No. 302,252. Patented July 22, 1884.

WITNESSES:
O. P. Wright
Wallace Greene

INVENTOR
John W. Henney
BY
Robt. H. Wiles
ATTORNEY

UNITED STATES PATENT OFFICE.

JOHN W. HENNEY, OF FREEPORT, ILLINOIS.

VEHICLE-SPRING.

SPECIFICATION forming part of Letters Patent No. 302,252, dated July 22, 1884.

Application filed May 19, 1884. (No model.)

*To all whom it may concern:*

Be it known that I, JOHN W. HENNEY, a resident of Freeport, in the county of Stephenson and State of Illinois, have invented certain new and useful Improvements in Vehicle-Springs; and I do hereby declare the following to be a full, clear, and exact description of the invention, such as will enable others skilled in the art to which it pertains to make and use the same.

My invention relates to improvements in vehicle-springs, and is fully explained, described, and claimed in the following specification, and shown in the accompanying drawings, in which—

Figure 1:
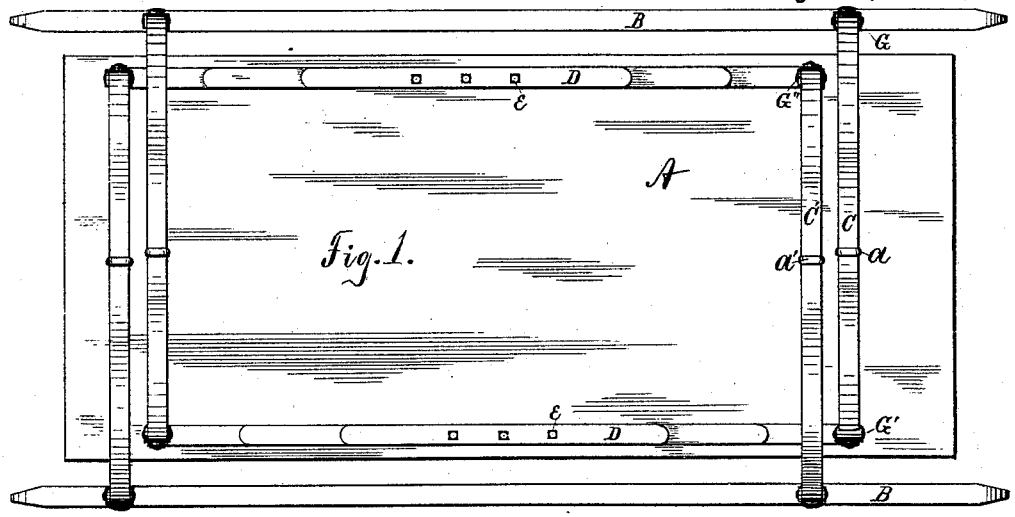
Figure 2:
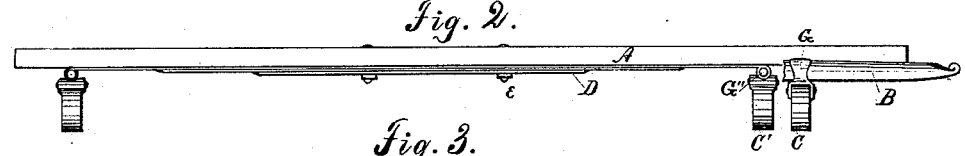
Figure 3:
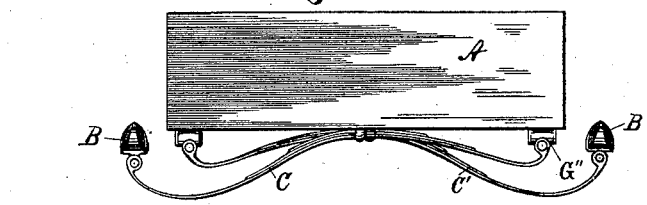
Figure 4:
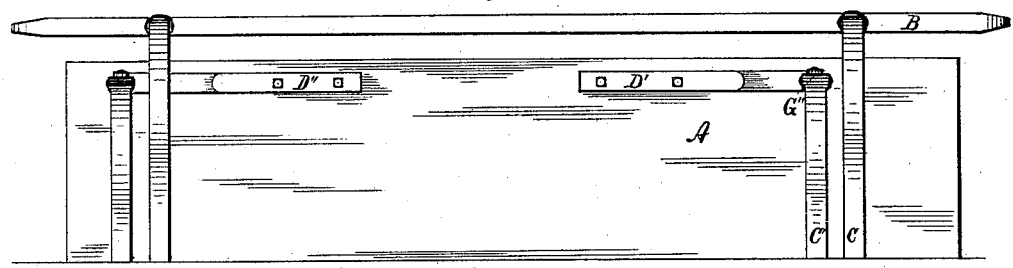

Figure 1 is a bottom plan of a vehicle-body with side bars on either side thereof, and my improved springs attached to said body and side bars; Fig. 2, a side elevation of the vehicle platform and springs, together with a portion of one of the side bars, the remainder of the side bar being broken away to show the platform; Fig. 3, a front elevation of the body, side bars, and front springs; Fig. 4, a bottom plan of a portion of the body and springs, and one of the side bars, showing a modified form of the invention; and Fig. 5, a similar view showing a third form thereof.

In these views, A is the body or platform of a vehicle, and B are the side bars arranged on opposite sides thereof and supported by any suitable means.

D, Figs. 1, 2, are preferably straight flexion-springs, each composed of any suitable number of leaves, bolted to the under side of the body, parallel to and at any desired distance from the sides thereof. The bolts $e\ e$, by which the springs D are fastened to the body, may be placed at equal distances from the ends of the springs, as shown in Figs. 1, 2, or at such unequal distances from said ends as to give any desired relative stiffness to the front and rear parts of the springs.

C C' are curved cross-springs, whose outer ends are dependent from the side bars, to which they are attached by means of suitable clips or shackles, G, while their inner ends are dependent from the ends of the longitudinal springs D D, with which they are connected by means of the swivel-shackles G' G''. I prefer that each of the cross-springs C C' shall cross the central line of the body and connect with the longitudinal spring D lying opposite the side bar to which its outer end is attached; but if the springs D be placed very near the central line of the body, each cross-spring may be supported by the side bar and longitudinal spring lying on the same side of the center. Each of the cross-springs C C' is curved downward from its points of connection with the side bar and longitudinal spring which support it, and curved upward at a point between its ends, and preferably nearer its inner than its outer end, the highest point being either a rounded curve or an obtuse angle. The highest portion of each of the cross-springs, whether it be curved or angular, is in contact with the body of the vehicle, and the contact-points of the four springs constitute the base of support of the body. Each of the cross-springs is a lever, whose fulcrum is its point of connection with the side bar, while the downward pressure of the body and the upward pressure of the longitudinal spring D constitute the weight and power, respectively, acting on the lever. Each cross-spring, it is true, is a yielding lever, adapted by its own flexion to afford a portion of the required vertical motion of the body; but whenever the tension of the cross-spring exceeds that of the longitudinal spring which supports its inner end, the longitudinal spring yields, and its free end bends downward from the body. Each of the springs C C' is held in place by a clip, $a\ a'$, crossing it at its point of contact with the body, and intended not to support the spring, but to prevent lateral motion thereof, and also to guard against any rebound of the body from the springs in crossing inequalities of surface. These clips are shown in the drawings as being very near the central line of the body; but their position depends of course on the location of the highest point in each of the cross-springs, and may be varied at will, as the curve of the springs is changed.

The form of spring shown in Fig. 4 is the same as that shown in the preceding figures, except that the spring D is replaced by two independent springs, D' D'', which operate the same as the two parts of each of the springs D. As shown in Fig. 4, these independent springs are short and in the same straight line; but they may be placed one outside the other, and each may be of such length as to extend from its cross-spring to the opposite end of the body. In this case they will have sufficient elasticity to afford all necessary vertical motion for the body, and the levers C C' may be rigid bars instead of springs.

Figure 5:
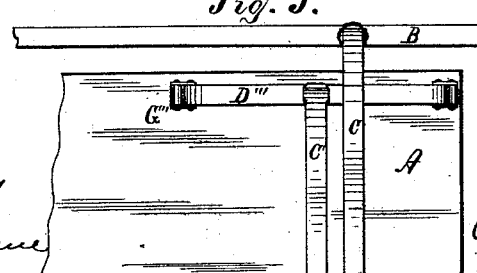

In Fig. 5 the cross-springs are the same as in the preceding figures; but the longitudinal spring D''', which supports the inner end of each cross-spring, is supported at both ends by suitable shackles, G''', and the end of the cross-spring, is suspended by a suitable shackle from the center of the longitudinal spring.

The practical operation of this device is the same as that of the forms previously described, the only difference being that as the spring D''' yields to the downward pull of the lever C', its point of greatest depression is at its center, while the springs D D' D'' yield at the end.

Having now described my invention and explained its operation, what I claim as new, and desire to secure by Letters Patent, is—

1. The combination, with the body and side bars of a vehicle, of longitudinal springs fastened to the bottom of the body on opposite sides of its center and susceptible of downward flexion, and two opposite pairs of levers, whose outer ends are suspended from the side bars and their inner ends from the free points of said longitudinal springs, each of said levers having between its ends a point of contact with the body, and the points of contact of all said levers with the body forming the base of support thereof.

2. The combination, with the body and side bars of a vehicle, of straight longitudinal springs fastened to the bottom of the body on opposite sides of the center and susceptible of downward flexion, and two opposite pairs of spring-levers, whose outer ends are suspended from the side bars and their inner ends from the free points of said longitudinal springs, each of said spring-levers having between its ends a point of contact with the bottom of the body, and the points of contact of all said spring-levers with the body constituting the base of support thereof.

3. The combination, with the body and side bars of a vehicle, of longitudinal springs fastened to the bottom of the body on opposite sides of its center and having free ends susceptible of downward flexion, and two opposite pairs of cross-springs, whose outer ends are suspended from the side bars and their inner ends from the free ends of said longitudinal springs, each of said cross-springs having between its points of suspension a point of contact with the bottom of the body, and the points of contact of said cross-springs with the body constituting the base of support thereof.

4. The combination, with the body and side bars of a vehicle, of longitudinal springs attached to the bottom of the body on opposite sides of the center thereof and having free ends susceptible of downward flexion, and two opposite pairs of cross-springs, each of which extends from one side bar to the free end of a longitudinal spring on the opposite side of the center from the side bar, and has its ends suspended from the side bar and the free end of the longitudinal spring, respectively, each of said cross springs having between its points of suspension a point of contact with the bottom of the body, and the points of contact of the cross-springs and the body constituting the base of support of the body.

5. The combination of the springs D D, body A, side bars, B, and springs C C', whose outer ends are suspended from the side bars and their inner ends from the free ends of the springs D, substantially as shown and described, and for the purpose set forth.

In testimony whereof I have signed this specification in the presence of two subscribing witnesses.

JOHN W. HENNEY.

Witnesses:
 OLIVER P. WRIGHT,
 WALLACE GREENE.